(12) United States Patent
Zhu et al.

(10) Patent No.: US 11,288,013 B2
(45) Date of Patent: Mar. 29, 2022

(54) HARDWARE BASED STATUS COLLECTOR ACCELERATION ENGINE FOR MEMORY SUB-SYSTEM OPERATIONS

(71) Applicant: Micron Technology, Inc., Boise, ID (US)

(72) Inventors: Fangfang Zhu, San Jose, CA (US); Jiangli Zhu, San Jose, CA (US); Ying Yu Tai, Mountain View, CA (US); Wei Wang, Dublin, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/916,934

(22) Filed: Jun. 30, 2020

(65) Prior Publication Data

US 2021/0019089 A1    Jan. 21, 2021

Related U.S. Application Data

(60) Provisional application No. 62/874,456, filed on Jul. 15, 2019.

(51) Int. Cl.
*G06F 3/06* (2006.01)
*G06F 11/10* (2006.01)

(52) U.S. Cl.
CPC .......... *G06F 3/0659* (2013.01); *G06F 3/0619* (2013.01); *G06F 3/0673* (2013.01); *G06F 11/1076* (2013.01)

(58) Field of Classification Search
CPC ...................................................... G06F 3/0659
USPC .................................. 714/764, 762, 765, 763
See application file for complete search history.

(56) References Cited

U.S. PATENT DOCUMENTS

| | | | |
|---|---|---|---|
| 2011/0067039 A1* | 3/2011 | Eilert ................. | G06F 15/17318 719/328 |
| 2013/0117766 A1* | 5/2013 | Bax ......................... | G06F 9/4405 719/323 |
| 2015/0188482 A1* | 7/2015 | Berkowitz .............. | H02S 10/20 320/101 |
| 2017/0147258 A1* | 5/2017 | Kim ...................... | G06F 12/0246 |
| 2018/0024966 A1* | 1/2018 | Eilert ................. | G06F 15/17318 719/328 |
| 2019/0034088 A1* | 1/2019 | Li ........................... | G06F 12/10 |

* cited by examiner

*Primary Examiner* — Fritz Alphonse
(74) *Attorney, Agent, or Firm* — Holland & Hart LLP

(57) ABSTRACT

Methods, systems, and devices for one or more acceleration engines for memory sub-system operations are described. An acceleration engine can perform one or more validation procedures on one or more codewords of a management unit. The acceleration engine can collect validation data for the management unit based on performing the validation procedures. The acceleration engine can aggregate the validation data into group validation data associated with a set of management units. The acceleration engine can transmit the group validation data to firmware of a memory sub-system or a host device.

26 Claims, 7 Drawing Sheets

HARDWARE BASED STATUS COLLECTOR ACCELERATION ENGINE FOR MEMORY SUB-SYSTEM OPERATIONS

CROSS REFERENCE

The present application for patent claims the benefit of U.S. Provisional Patent Application No. 62/874,456 by ZHU et al., entitled "HARDWARE BASED STATUS COLLECTOR ACCELERATION ENGINE FOR MEMORY SUB-SYSTEM OPERATIONS," filed Jul. 15, 2019, assigned to the assignee hereof, and expressly incorporated by reference in its entirety herein.

TECHNICAL FIELD

The following relates generally to a memory sub-system and more specifically to a hardware based status collector acceleration engine for memory sub-system operations.

BACKGROUND

A memory sub-system can be a storage device, a memory module, and a hybrid of a storage device and memory module. The memory sub-system can include one or more memory components that store data. The memory components can be, for example, non-volatile memory components and volatile memory components. In general, a host system can utilize a memory sub-system to store data at the memory components and to retrieve data from the memory components.

DETAILED DESCRIPTION

Figure 1:
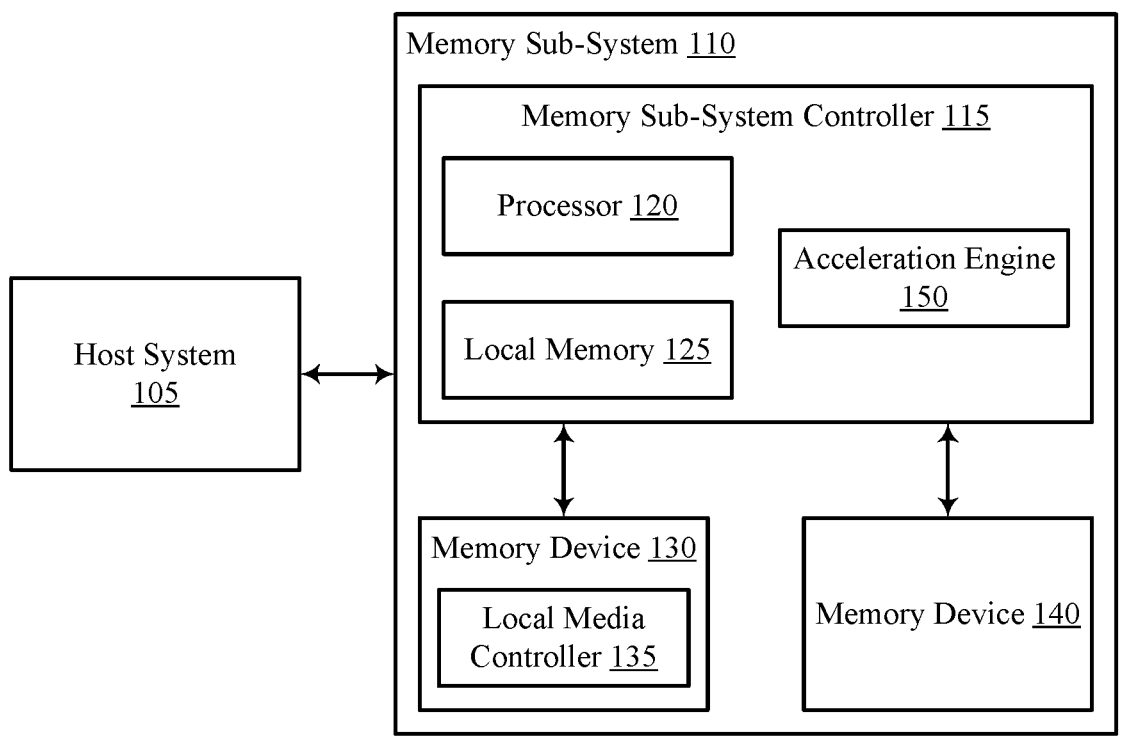
FIG. 1 illustrates an example of a computing environment in accordance with examples as disclosed herein.

Aspects of the present disclosure are directed to a hardware based status collector acceleration engine for memory sub-system operations. A memory sub-system can be a storage device, a memory module, or a hybrid of a storage device and memory module. Examples of storage devices and memory modules are described with reference to FIG. 1. In general, a host system can utilize a memory sub-system that includes one or more memory components. The host system can provide data to be stored at the memory sub-system and can request data to be retrieved from the memory sub-system.

The host system can send access requests to the memory sub-system, such as to store data at the memory sub-system and to read data from the memory sub-system. The data to be read and written are hereinafter referred to as "user data". A host request can include a logical address (e.g., logical block address (LBA)) for the user data, which is the location the host system associates with the user data. The logical address (e.g., LBA) can be part of metadata for the user data.

The memory components can include non-volatile and volatile memory devices. A non-volatile memory device is a package of one or more dice. The dice in the packages can be assigned to one or more channels for communicating with a memory sub-system controller. The non-volatile memory devices include cells (i.e., electronic circuits that store information), that are grouped into pages to store bits of data.

The non-volatile memory devices can include, for example, three-dimensional cross-point ("3D cross-point") memory devices that are a cross-point array of non-volatile memory that can perform bit storage based on a change of bulk resistance, in conjunction with a stackable cross-gridded data access array.

Such non-volatile memory devices can group pages across dice and channels to form management units (MUs). A MU can include user data and corresponding metadata. A memory sub-system controller can send and receive user data and corresponding metadata as management units to and from memory devices. A super management unit (SMU) is a group of one or more MUs that are managed together. For example, a memory sub-system controller can perform media management operations (e.g., wear level operations, refresh operations, etc.) on SMUs.

A memory sub-system can perform operations, such as initialization operations (e.g., formatting) and media management operations (e.g., defect scanning, wear leveling, refresh), on the non-volatile memory devices. For example, the memory sub-system can perform a defect scan to determine the failure rate of memory cells of the memory devices. Additionally or alternatively, the memory sub-system can perform a format procedure (i.e., a format operation) that writes fixed data patterns to the non-volatile media to reset, erase, or preconfigure data on the memory devices. In some examples, the memory sub-system can perform a wear leveling procedure (i.e., a wear leveling operation) to distribute write operations across the memory devices to mitigate performance reduction due to wear of the memory devices of the memory sub-system.

In conventional cases, the memory sub-system includes firmware that manages the initialization operations and media management operations, as well as monitoring the status of the memory devices. Such conventional firmware management can take a relatively long time to perform (e.g., hours, days).

Aspects of the present disclosure address the above and other deficiencies by having a memory sub-system that includes a hardware design of one or more acceleration engines for performing memory sub-system operations. The hardware based acceleration engines of the memory sub-system and the described techniques can enable operations, such as, and not limited to, initialization operations (e.g., format operations), media management operations (e.g., defect scans, wear leveling procedures), and the like to be performed relatively faster, among other advantages such as higher reliability of memory devices, reduced processing overhead, etc.

The hardware can include a digital circuitry with dedicated (i.e., hard-coded) logic to perform the operations described herein. In some embodiments, the hardware is part of a controller of the memory sub-system. The memory device can include a status collector acceleration engine. The status collector acceleration engine can enable hardware of the sub-system controller to determine and send memory device statistics, for example, to firmware of the memory sub-system. The status collector acceleration engine can collect, aggregate, analyze, or otherwise determine statistics (e.g., as part of a defect scan procedure) about the media of the memory sub-system. In some examples, the statistics can be associated with a MU, an SMU, a page, a die, or a deck of the memory subsystem (e.g., a memory device of the memory sub-system). Allocating such processes or operations to the hardware of the memory sub-system controller can enable decreased communication bandwidth (e.g., compared to transmitting each MU level data), less processing overhead at a central processing unit (CPU) (e.g., processing device) of the memory sub-system, lower power requirements of the CPU, faster memory device operations (e.g., defect scans, formatting operations, wear leveling operations), among other advantages.

Features of the disclosure are initially described in the context of a computing environment as described with reference to FIG. 1. Features of the disclosure are described in the context of memory sub-systems and memory formats as described with reference to FIGS. 2-4. These and other features of the disclosure are further illustrated by and described with reference to a computer diagram and flowcharts that relate to acceleration engines for memory sub-system operations as described with references to FIGS. 5-7.

FIG. 1 illustrates an example of a computing environment 100 in accordance with examples as disclosed herein. The computing environment can include a host system 105 and a memory sub-system 110. The memory sub-system 110 can include media, such as one or more non-volatile memory devices (e.g., memory device 130), one or more volatile memory devices (e.g., memory device 140), or a combination thereof.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 105 that is coupled with a memory system. The memory system can be one or more memory sub-systems 110. In some examples, the host system 105 is coupled with different types of memory sub-systems 110. FIG. 1 illustrates one example of a host system 105 coupled with one memory sub-system 110. The host system 105 uses the memory sub-system 110, for example, to write data to the memory sub-system 110 and read data from the memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 105 can be a computing device such as a desktop computer, laptop computer, network server, mobile device, a vehicle (e.g., airplane, drone, train, automobile, or other conveyance), embedded systems, Internet of Things (IoT) devices, or such computing device that includes a memory and a processing device. The host system 105 can be coupled to the memory sub-system 110 using a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 105 and the memory sub-system 110. The host system 105 can further utilize a non-volatile memory (NVM) Express (NVMe) interface to access the memory components (e.g., memory devices 130) when the memory sub-system 110 is coupled with the host system 105 by the PCIe interface. The physical host interface can provide an interface for passing control, address, data, and other signals between the memory sub-system 110 and the host system 105.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

An example of non-volatile memory devices (e.g., memory device 130) includes a 3D cross-point type flash memory, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Although non-volatile memory components such as 3D cross-point type memory are described, the memory device 130 can be based on any other type of non-volatile memory, such as negative-and (NAND), read-only memory (ROM), phase change memory (PCM), self-selecting memory, other chalcogenide based memories, ferroelectric random access memory (FeRAM), magneto random access memory (MRAM), negative-or (NOR) flash memory, and electrically erasable programmable read-only memory (EEPROM).

In some embodiments, each of the memory devices 130 can include one or more arrays of memory cells such as single level cells (SLCs), multi-level cells (MLCs), triple level cells (TLCs), quad-level cells (QLCs), or a combination of such. In some examples, a particular memory component can include an SLC portion, and an MLC portion, a TLC portion, or a QLC portion of memory cells. Each of the memory cells can store one or more bits of data used by the host system 105.

Furthermore, the memory cells of the memory devices 130 can be grouped as memory pages or memory blocks that can refer to a unit of the memory component used to store data. The memory pages can be grouped across dice and channels to form MUs. A MU can include user data and corresponding metadata. A memory sub-system controller can send and receive user data and corresponding metadata as management units to and from memory devices. A super management unit (SMU) is a group of one or more MUs that are managed together. For example, a memory sub-system controller can perform media management operations (e.g., wear level operations, refresh operations, etc.) on SMUs. The memory sub-system controller can also perform media management operations (e.g., wear level operations, refresh operations, etc.) on MUs.

The memory sub-system controller 115 can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 120 (e.g., a processing device) configured to execute instructions stored in a local memory 125. In the illustrated example, the local memory 125 of the memory sub-system controller 115 includes an embedded memory configured to store instructions for performing various processes, operations, logic flows, and routines that control operation of the memory sub-system 110, including handling communications between the memory sub-system 110 and the host system 105.

In some examples, the local memory 125 can include memory registers storing memory pointers, fetched data, etc. The local memory 125 can also include read-only memory (ROM) for storing micro-code. While the example memory sub-system 110 in FIG. 1 has been illustrated as including the memory sub-system controller 115, in another example of the present disclosure, a memory sub-system 110 cannot include a memory sub-system controller 115, and can instead rely upon external control (e.g., provided by an external host, or by a processor or controller separate from the memory sub-system).

In general, the memory sub-system controller 115 can receive commands or operations from the host system 105 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., LBA) and a physical address that are associated with the memory devices 130. The memory sub-system controller 115 can further include host interface circuitry to communicate with the host system 105 via the physical host interface. The host interface circuitry can convert the commands received from the host system into command instructions to access the memory devices 130 as well as convert responses associated with the memory devices 130 into information for the host system 105.

The memory sub-system 110 can also include additional circuitry or components that are not illustrated. In some examples, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage a media device (e.g., perform media management operations on the memory device 130). In some embodiments, the memory devices 130 can be locally managed memory devices, which is a raw memory device combined with a local media controller 135 that performs memory management operations on the memory device 130 within the same memory device package.

The memory sub-system 110 includes an acceleration engine 150 that converts commands for an SMU to commands for MUs to perform operations related to memory sub-system operations as described herein. "Convert" includes creating one or more MU level commands for a corresponding SMU level command. The acceleration engine 150 can enable the operations (e.g., format operations, scans such as defect scans, wear leveling operations, and the like) to be performed relatively faster, among other advantages such as higher reliability of memory devices, reduced processing overhead (e.g., of the processor 120 or the host system 105), and reduced processing power usage. In some embodiments, the memory sub-system controller 115 can include multiple acceleration engines 150. In some examples, the memory sub-system controller 115 includes at least a portion of the acceleration engine 150. In some embodiments, the acceleration engine 150 is hardware that is part of the host system 105.

The acceleration engine 150 can be hardware of the memory sub-system controller 115, the local media controller 135 or a combination thereof. The hardware can include a digital circuitry with dedicated (i.e., hard-coded) logic to perform the operations described herein. The acceleration engine 150 can be configured to receive SMU level commands. The SMU level commands can be received from, for example, firmware of the memory sub-system 110, another component of the memory sub-system controller 115, or the host system 105. The acceleration engine 150 (e.g., a command queue acceleration engine) can generate one or more MU level commands based on the SMU level command. Additionally or alternatively, the acceleration engine 150 can generate or otherwise determine statistics for one or more MUs, SMUs, dies, pages, channels, or a combination thereof, of the memory device 130. Further details with regards to the operations of the acceleration engine 150 are described below.

Figure 2:
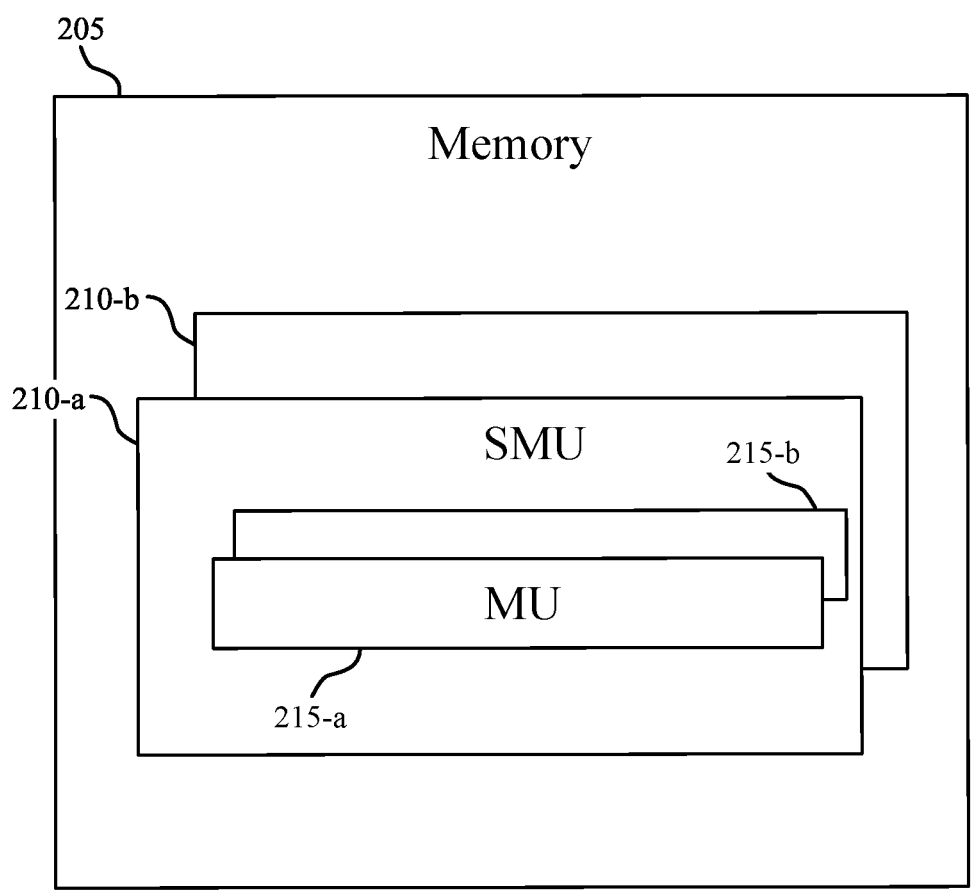
FIG. 2 illustrates an example of a memory sub-system that supports acceleration engines for memory sub-system operations in accordance with aspects of the present disclosure.

FIG. 2 illustrates an example of a memory sub-system 200 that supports acceleration engines for memory sub-system operations in accordance with aspects of the present disclosure. In some examples, memory sub-system 200 can implement aspects of computing environment 100. Memory sub-system 200 can include one or more memory devices 205. Some non-volatile memory devices can group pages across dice and channels to form management units (MUs). A MU can include user data and corresponding metadata. A memory sub-system controller can send and receive user data and corresponding metadata as management units to and from memory devices 205. In some embodiments, MUs 215 can be groups of dies, channels, pages, codewords, parity bits, memory cells, or a combination thereof. The MUs 215 can enable a memory sub-system controller to manage (e.g., perform operations, procedures, and the like) on portions of the memory device 205 in allocated groups or sections of the media.

A super management unit (SMU) is a group of one or more MUs. For example, SMU 210-*a* can include MU 215-*a* and MU 215-*b*. The MUs in an SMU are managed together. For example, a memory sub-system controller can perform initialization and media management operations (e.g., wear level operations, refresh operations, etc.) on SMUs.

In some examples, various memory sub-system operations can be performed on the memory device 205. In some examples, the memory sub-system operations can include a defect scan to identify defective portions of the memory device 205, a format procedure for memory device 205 to reset or write patterns of data (e.g., all 0's, all 1's, a configured pattern of 0's and 1's, among other patterns), a wear leveling procedure moving data between SMUs 210, MUs 215, or both, (e.g., to distribute data based on the performance of various portions of the memory device 205 to mitigate the effect of poor performance in certain portions, such as a "bad" die, MU, SMU, deck, page, channel, or a combination thereof), among other such operations.

For example, a hardware based accelerator, such as acceleration engine 150, can perform a defect scan on the memory device 205. The acceleration engine 150 can write and/or read to the memory device 205 as part of a validation operation to determine the functionality or performance of each MU 215 (e.g., gathering validation information or statistics such as a failure bit count (FBC) of codewords of the MU 215-*a* and the MU 215-*b*). Additionally or alternatively, the acceleration engine can process the statistics or data to mark or otherwise determine the performance of each MU 215. For example, the acceleration engine can mark a codeword of MU 215-*a* as a "bad" codeword if the statistics (e.g., an average FBC or a maximum FBC) satisfy a threshold. In some cases, MU 215-*a* can be marked as a "bad" MU if a quantity of codewords of the MU 215-*a* marked as "bad" satisfies a threshold. Additionally or alternatively, a die, channel, SMU, etc. can be marked as "bad" based on the determined statistics satisfying a threshold.

The acceleration engine (e.g., a command queue acceleration engine) can receive commands, for example, from the firmware of the memory sub-system 200 (not shown), for an SMU 210. For example, the memory sub-system controller can receive a write command associated with a format operation for SMU 210-*a*. The acceleration engine can generate commands for one or more MUs 215 based on the command for the SMU. For instance, the acceleration engine can generate write commands for MU 215-*a* and MU 215-*b* based on the received write command for SMU 210-*a*. Additionally the acceleration engine can generate or otherwise determine statistics for one or more MUs 215, SMUs 210, dies, pages, channels, or a combination thereof, of the memory device 205 (e.g., as part of a defect scan operation).

Figure 3:
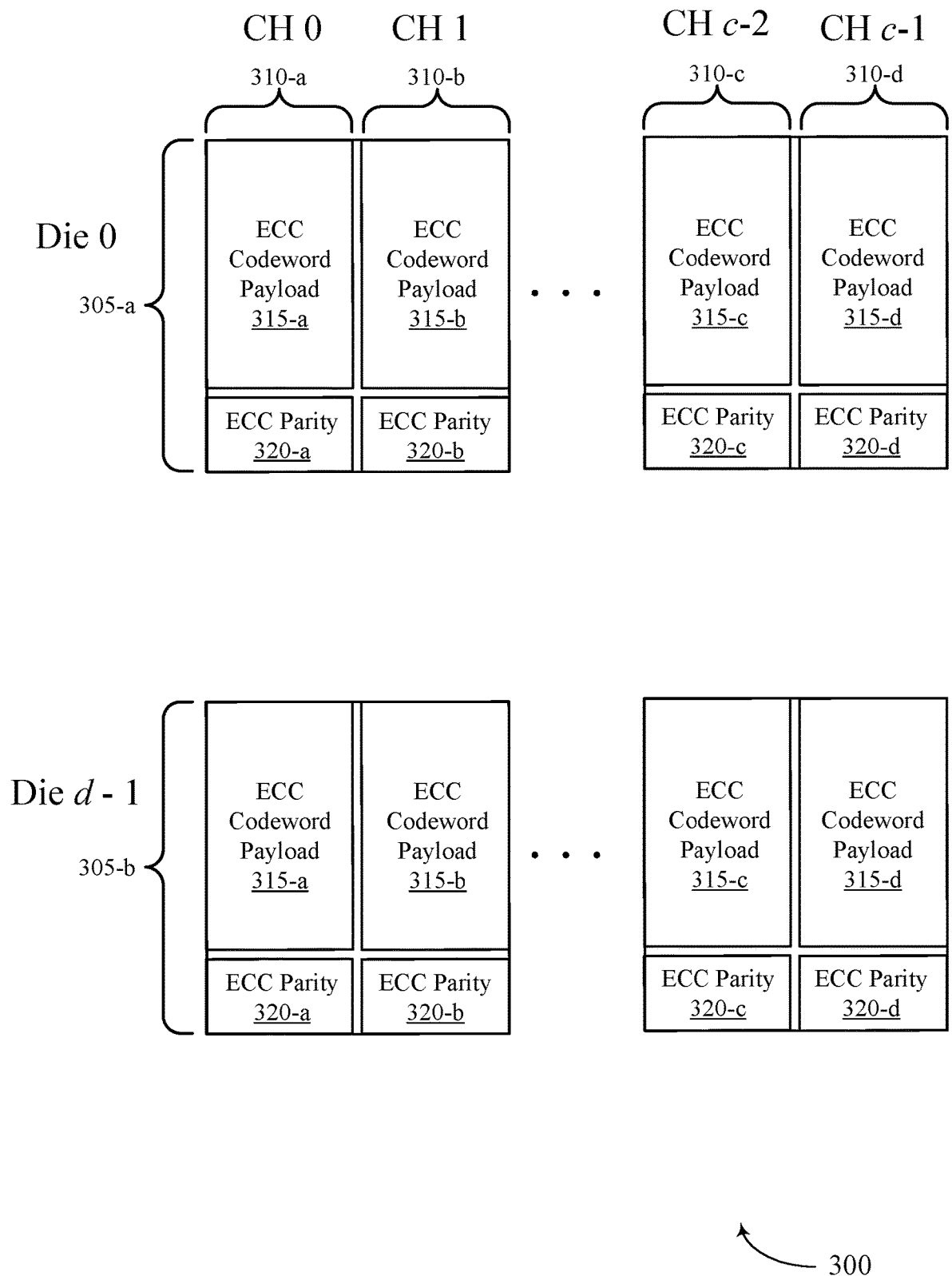
FIG. 3 illustrates an example of data structures that support acceleration engines for memory sub-system operations in accordance with aspects of the present disclosure.

FIG. 3 illustrates an example of management unit data structures 300 that supports acceleration engines for memory sub-system operations in accordance with aspects of the present disclosure. In some examples, data structures 300 can implement aspects of computing environment 100 or memory sub-system 200. FIG. 3 illustrates an example data structure of a MU used for validation operations, such as a MU 215 as described with reference to FIG. 2.

Some non-volatile memory devices can group pages across dice and channels to form management units (MUs). A MU can include user data and corresponding metadata. The data structures 300 can illustrate an example layout of a MU across multiple dies 305 and channels 310. For example, the MU can include pages of a memory device across die 305-*a* and channels 310-*a*, 310-*b*, 310-*c*, and 310-*d*. The pages can include information related to validation operations such as error detection procedures, which can also be referred to as error-correcting codes (ECC) processes, ECC operations, ECC techniques, or in some cases as simply ECC. In some examples, ECCs (e.g., block codes, convolutional codes, Hamming codes, low-density parity-check codes, turbo codes, polar codes) can be used in the error detection procedures. For example, an ECC codeword payload 315-*a* and an ECC Parity bit 320-*a* can be located at die 305-*a* and channel 310-*a*, and can be used for determining a performance of the MU (e.g., an average FBC, a max FBC, etc.)

In some examples, such codewords and ECCs can be used in error detection or correction procedures to determine and/or output error detection information for the memory device. For example, a read operation can utilize the ECC codeword payload 315-*a* and the ECC parity bit 320-*a* to determine whether one or more bits or memory cells of the codeword associated with the ECC codeword payload 315-*a* are performing as expected (e.g., whether a state of a memory cell contains an expected state). In some cases, the error detection information for the codeword can be aggregated or otherwise consolidated into information (e.g., results of one or more validation operations) for a die, channel, page, MU, SMU, or deck of the memory device as discussed herein.

In some cases, a memory sub-system controller or a memory device can perform various memory sub-system operations (e.g., an ECC operation) to a MU, such as a MU with the format illustrated in FIG. 3. In some cases, hardware of the memory sub-system controller can generate or perform write commands, move commands, read commands, and the like to one or more MUs (e.g., as part of a defect scan, a format operation, a wear leveling operation, or a combination thereof).

The memory sub-system controller (e.g., a memory sub-system controller such as memory sub-system controller 115, a local media controller 135, or a combination thereof) or the memory device (e.g., the memory device 205) can include one or more acceleration engines (e.g., hardware of the memory device or the memory sub-system controller) configured to perform such operations or commands. For example, the memory sub-system controller can include an acceleration engine (e.g., a command queue acceleration engine) configured to receive commands, from firmware of the memory device, for an SMU. The memory sub-system controller can receive a read command associated with an ECC operation for the SMU. The acceleration engine can generate commands for one or more MUs based on the command for the SMU. For instance, the acceleration engine can generate corresponding read commands for each codeword of the MU illustrated in FIG. 3. Additionally or alternatively, the memory sub-system controller or memory device can include an acceleration engine configured to generate or otherwise determine statistics for one or more MUs, SMUs, dies 305, pages, channels 310, or a combination thereof, of the memory device. For example, the acceleration engine can generate or receive statistics based on data determined by the ECC operations for each MU of an SMU, and aggregate the statistics into group statistics for the SMU.

Figure 4:
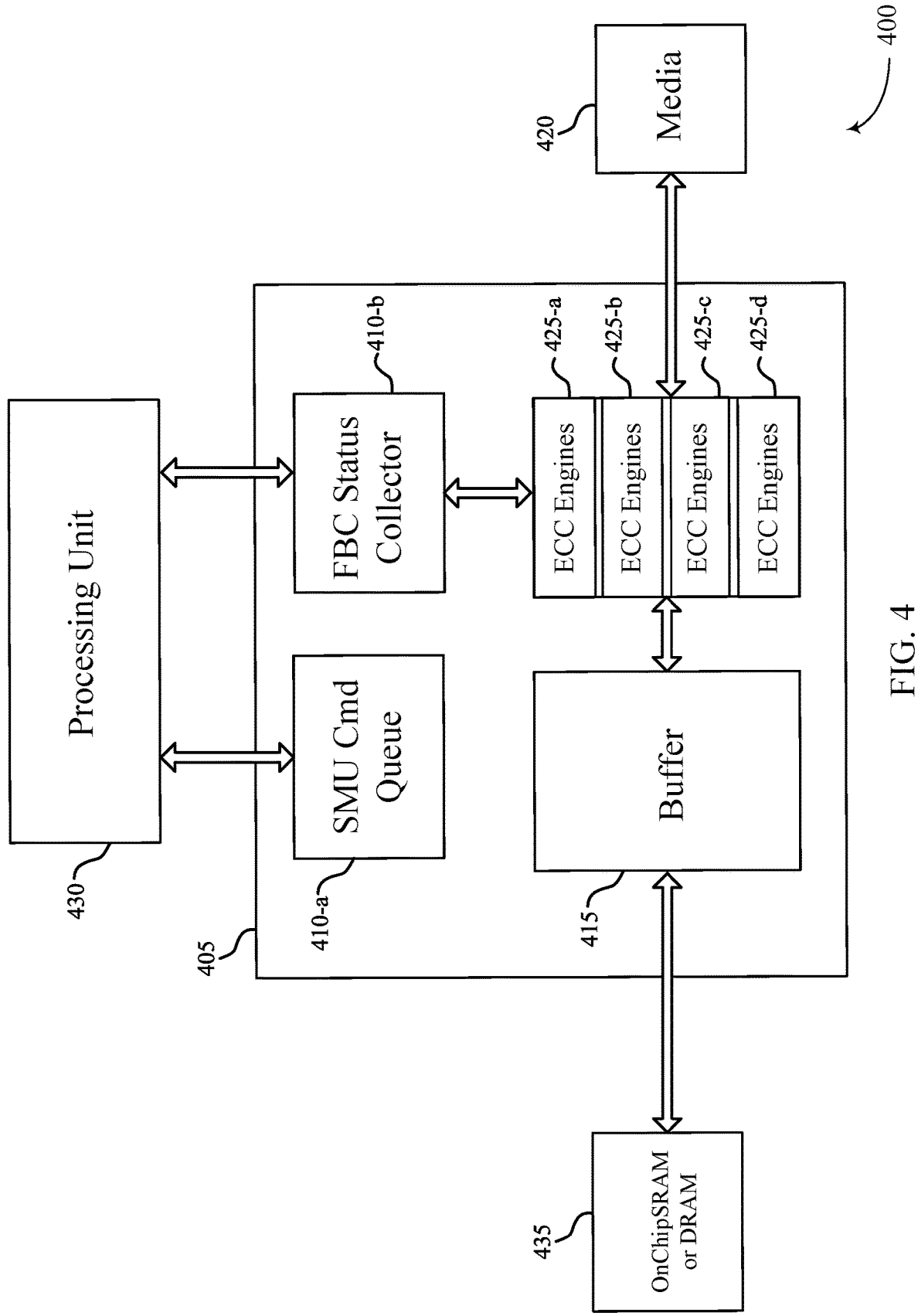
FIG. 4 illustrates an example of a memory sub-system that supports acceleration engines for memory sub-system operations in accordance with aspects of the present disclosure.

FIG. 4 illustrates an example of a memory sub-system 400 that supports acceleration engines for memory sub-system operations in accordance with aspects of the present disclosure. In some examples, memory sub-system 400 can implement aspects of computing environment 100, memory sub-system 200, data structures 300, or a combination thereof. FIG. 4 illustrates an example memory sub-system with acceleration engines 410 which can enable a memory sub-system to perform memory sub-system operations relatively quicker, more efficiently, and with less processing overhead by offloading various processes to the hardware of a memory device or sub-system such as the acceleration engines 410.

The memory sub-system 400 can be an example of the memory sub-system 110 as described with reference to FIG. 1. The memory sub-system 400 can include a memory controller 405. Memory controller 405 can be an example of a memory sub-system controller 115, a local media controller 135, as described with reference to FIG. 1. Memory controller 405 can include one or more acceleration engines 410 (e.g., acceleration engine 150 as described with reference to FIG. 1), such as command queue acceleration engine 410-a, status collector acceleration engine 410-b, or both. Memory controller 405 can also include a buffer 415, which can be an example of memory storage locally accessible to the memory controller 405. In some cases, the buffer 415 can be an example of local memory 125 as described with reference to FIG. 1. Memory controller 405 can also include ECC engines 425, which can be examples of hardware engines (e.g., decoders) configured to collect ECC information (e.g., validation data and/or failure data) for codewords of a MU.

The memory sub-system 400 can include a media 420. The media 420 can include aspects of a memory device 130 or a memory device 140 as described with reference to FIG. 1, and/or a memory device 205 as described with reference to FIG. 2. For example, media 420 can include SMUs (e.g., an SMU 210) and MUs (e.g., MUs 215). The media 420 can be in communication with the memory controller 405, as well as other various components of memory sub-system 400.

In some examples, memory sub-system operations can be performed in the memory sub-system 400. For example, the memory sub-system operations can be performed on a portion of the media 420 (e.g., an SMU of the media 420). In some examples, the memory sub-system operations can include a defect scan to identify defective portions of the media 420. Additionally or alternatively, the memory sub-system operations can include a format operation to reset or write patterns of data of portions of the media 420 (e.g., all 0's, all 1's, a configured pattern of 0's and 1's, among other patterns). Additionally or alternatively, the memory sub-system operations can include a wear leveling operation moving data between portions of the media 420, for example, to distribute data based on the performance of SMUs or MUs of the media 420 in order to mitigate the effect of SMUs or MUs with relatively poor FBC statistics, such as a "bad" die, MU, SMU, deck, page, channel, or a combination thereof.

The memory sub-system 400 can include acceleration engines 410. The acceleration engines 410 can be hardware of the memory sub-system (e.g., hardware of a memory device or the memory controller 405). In some examples, the acceleration engines 410 can be examples of the acceleration engine 150 as described with reference to FIG. 1. The acceleration engines 410 can be configured to perform aspects of the memory sub-system operations, which can enable relatively faster performance, less processing overhead (e.g., by performing processes instead of firmware processed at a processing unit 430), among other advantages. In some examples, the acceleration engines can be implemented individually in the memory sub-system 400. In some examples, the acceleration engines can be implemented together in the memory sub-system 400. In some other examples, the functions of the acceleration engines 410 can be implemented by a single acceleration engine 410. In any case, various functions of each acceleration engine 410 as described herein can be implemented in a different order or by different components of the memory sub-system 400.

The acceleration engine 410-a can be an example of a command queue acceleration engine. The acceleration engine 410-a can receive, for example, from firmware of the memory sub-system (e.g., firmware of the processing unit 430), a read, write, or move SMU command associated with a memory sub-system operation. For example, the acceleration engine 410-a can receive a command for an SMU of the media 420. The acceleration engine 410-a can generate one or more corresponding commands for one or more MUs of the SMU. For example, the acceleration engine 410-a can generate and/or issue commands for one or more codewords or memory cells of the MU based on the command for the SMU. In some cases, the acceleration engine 410-a can generate such commands for some or all of the MUs of the SMU.

The firmware of the memory sub-system can send a write command for an SMU of the media 420 as part of a formatting operation. The command can include instructions to format data of the SMU into fixed patterns. For example, the data can be formatted to be all 0's, all 1's, or a configured pattern of 0's and 1's. The acceleration engine 410-a can generate one or more write commands for a MU based on the write command for the SMU. For example, the acceleration engine 410-a can issue write commands to each MU of the SMU to format the data of each MU into a fixed pattern. In some examples, write information can specify the pattern or a data state to be written. For example, the acceleration engine 410-a can retrieve write information indicating that data of a MU be written to one or more states (e.g., all 0's). In some cases, the write information can be sent to the acceleration engine 410-a from the firmware. In some other cases, the acceleration engine 410-a can receive or retrieve the write information from a memory component 435 (e.g., the write information can be stored on the memory component 435). In some cases, the memory component 435 can be an example of an on chip static RAM or DRAM (OnChipSRAM-or-DRAM) component.

Additionally or alternatively, the write information can be stored on the buffer 415. Storing the write information on the buffer 415 can reduce the time required to format the SMU (e.g., when the data or data pattern to be written to each MU of the SMU is the same). For example, because the buffer 415 can be locally accessible memory (i.e., located in the memory controller 405), storing and retrieving the write information from the buffer 415 can be relatively faster than retrieving the write information for each MU from the memory component 435.

In some examples, the firmware can send a read command for an SMU of the media 420. In such examples, the acceleration engine 410-a can generate one or more read commands for a MU based on the read command for the SMU. For example, the acceleration engine 410-a can issue read commands to each MU of the SMU to obtain read data of each MU of the SMU. The read data can be sent to the buffer 415 and/or the memory component 435. Additionally or alternatively, hardware of the memory sub-system (e.g., acceleration engine 410-b) can generate statistics (e.g., FBC statistics) based on the read data and transmit the statistics to the firmware, for example, as part of a validation operation.

The acceleration engine 410-a can process multiple SMU level or MU level commands concurrently. For example, the acceleration engine 410-*a* can receive a read, write, or move command for multiple SMUs. The acceleration engine 410-*a* can generate and/or issue a set of corresponding commands for each SMU level command concurrently. A set can include one or more commands. Additionally or alternatively, the acceleration engine 410-*a* can process multiple commands of the set of commands for an SMU concurrently. That is, the acceleration engine 410-*a* can generate and/or issue multiple commands for each MU of the SMU concurrently. In some examples, the quantity of concurrent MU level commands can be programmable, e.g., to adjust the speed of a memory sub-system operation, dynamically respond to bandwidth requirements of the hardware, among other advantages.

In some examples, the acceleration engine 410-*b* can be an example of a status collector acceleration engine. For example, the acceleration engine 410-*b* can be hardware configured to receive status information from one or more ECC engines 425. The status information can be read data based on a read command (e.g., an access operation), read statistics, validation information or statistics (e.g., error detection information or statistics from one or more ECC procedures as described herein), and the like. The acceleration engine 410-*b* can determine statistics for a MU, an SMU, a die, a deck, or a combination thereof based on the status information from the ECC engines 425. Performing such functions by the hardware (e.g., rather than the firmware), for example, of the memory sub-system controller can enable faster operation times.

For example, the acceleration engine 410-*b* can receive validation information from ECC engines 425. That is, the ECC engines 425 can output codeword information for a codeword of a MU. For instance, the ECC engine 425-*a* can perform one or more validation operations (e.g., ECC operations) to obtain codeword information (e.g., statistics for the codeword of the MU). In some examples, the codeword information can include one or more FBCs for the codeword (e.g., a 0 to 1 FBC, a 1 to 0 FBC, or both), the number of 1's of the codeword, the number of 0's of the codeword, or other such metrics. In some cases, the acceleration engine 410-*b* can receive the codeword information, for example, as part of a defect scan operation.

The acceleration engine 410-*b* can process the information from the ECC engines 425. For example, the acceleration engine 410-*b* can consolidate the codeword information (e.g., including codeword statistics for a MU of an SMU) into group statistics. The group statistics can be statistics corresponding to a MU, an SMU, a die, a deck of the memory device, or a combination thereof. For example, the group statistics can include an average FBC of one or more MUs, a maximum FBC of one or more MUs, or other such statistics determined from the codeword information (e.g., the read data or statistics associated with the codewords of each MU in the SMU). In some examples, the group statistics can include die or deck level histograms based on the consolidated codeword information (e.g., the 0 to 1 FBC, the 1 to 0 FBC, the number of 1's or 0's, or a combination of such metrics of all the codewords of a die or deck). The acceleration engine 410-*b* can discard the information or data (e.g., the codeword information and other read data of a MU) used to aggregate the group statistics, for example, to reduce the communication bandwidth of sending large amounts of MU level data to the firmware. The acceleration engine 410-*b* can send the group statistics to the firmware. In some cases, the firmware can determine and mark the performance of the MUs, SMUs, dies, or decks based on the group statistics. In some other cases, the acceleration engine 410-*b* can determine and mark the performances and send an indication of the performances to the firmware.

The acceleration engine 410-*b* can use such information or statistics (e.g., the group statistics, the codeword information from the ECC engines 425, or other read data associated with one or more MUs) as parameters of one or more memory sub-system operations. For example, media management algorithms can use the statistics as inputs to adjust one or more parameters of the memory sub-system, the memory device, the algorithm, or the operations. For example, an algorithm used for determining data allocation as part of a wear leveling operation can use the statistics to determine which portions of the media 420 are relatively "worn" (e.g., marked as "bad"). The algorithm can determine to move data from one SMU or MU to another SMU or MU accordingly. For instance, the firmware can issue an SMU move command to transfer data from a "bad" SMU to a relatively "good" SMU. In some examples, the acceleration engine 410-*a* can break the SMU move command into one or more MU move commands.

In some cases, the memory sub-system 400 can include both acceleration engines 410-*a* and 410-*b*. For example, a defect scan of the media 420 can include both write commands and read commands. The firmware can issue a write command for an SMU to the acceleration engine 410-*a*. The acceleration engine 410-*a* can divide the write command for the SMU into one or more write commands for one or more MUs of the SMU. As an example, the write commands can be 0 to 1 write commands, 1 to 0 write commands, or both. The firmware can also issue a read command, e.g., to verify that the data or data pattern written to the SMU was written and/or read correctly. The acceleration engine 410-*a* can divide the read command for the SMU into one or more read commands for the one or more MUs of the SMU. Hardware of the memory controller (e.g., the ECC engines 425) can perform validation operations based on the MU level write commands and MU level read commands to output data to the acceleration engine 410-*b*. The acceleration engine 410-*b* can consolidate the data into group statistics and transmit the group statistics to the firmware.

Figure 5:
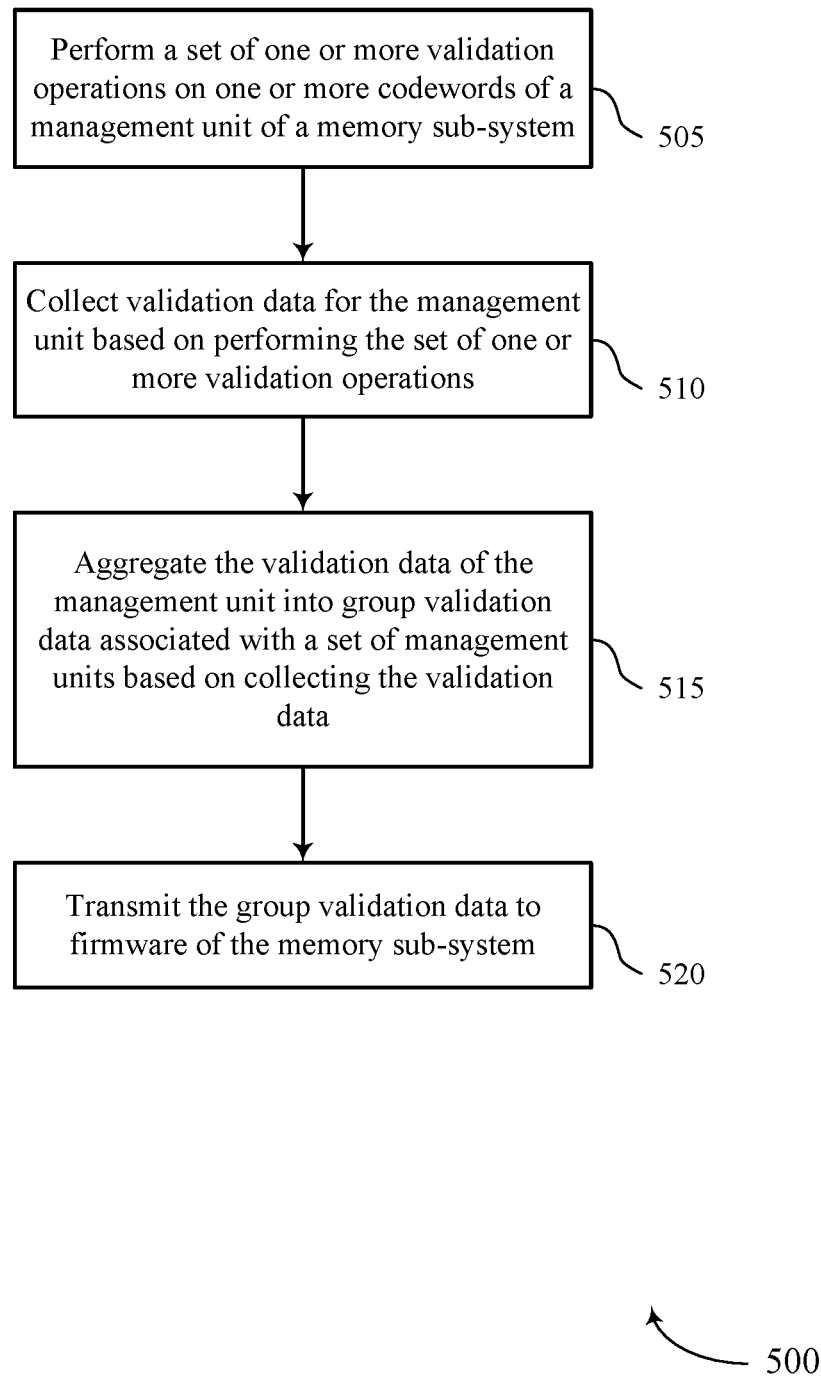
FIGS. 5 and 6 show flowcharts illustrating a method or methods for performing operations in accordance with examples as disclosed herein.

FIG. 5 shows a flowchart illustrating a method or methods 500 for performing operations on a set of management units, in accordance with aspects of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by a hardware based acceleration engine 150 of FIG. 1. The hardware can include processing logic, such as digital circuitry with dedicated (i.e., hard-coded) logic, to perform the operations described herein.

Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment. Other operation flows are possible.

At 505, the processing logic may perform a set of one or more validation operations on one or more codewords of a management unit of a memory sub-system. In some examples, the processing logic may generate a command to collect validation data of the management unit, where performing the set of one or more validation operations is based at least in part on generating the command. In some examples, the management unit includes pages associated with one or more dies and channels of the memory sub-system. In some examples, the memory sub-system may be a 3-dimensional (3D) cross-point sub-system.

At 510, the processing logic may collect validation data for the management unit based on performing the set of one or more validation operations. In some examples, the set of one or more validation operations includes one or more FBC operations, one or more read operations, or a combination thereof. In some examples, the set of one or more validation operations may be performed by one or more ECC engines.

At 515, the processing logic may aggregate, by hardware of the memory sub-system, the validation data of the management unit into group validation data associated with a set of management units based on collecting the validation data. The aggregating can be done by hardware of the memory sub-system or another component of the memory sub-system controller (e.g., an acceleration engine of the memory sub-system).

In some examples, the processing logic may generate statistics based on the validation data, where aggregating the validation data may be based on generating the statistics. The generating may be done by hardware of the memory sub-system controller or another component of the memory-sub system. In some examples, the statistics include a histogram, a greatest FBC, an average FBC of the management unit, a quantity of a subset of memory cells of a codeword corresponding to a state, or a combination thereof. In some examples, the statistics correspond to a die of the memory sub-system, a deck of the memory sub-system, a management unit of the memory sub-system, the set of management units of the memory sub-system, or a combination thereof.

In some examples, the processing logic may store the validation data in a buffer of the memory sub-system based on collecting the validation data, the validation data including results of the set of one or more validation operations, where aggregating the validation data may be based on storing the validation data in the buffer At 520, the processing logic may transmit the group validation data to firmware of the memory sub-system. In some examples, the processing logic may transmit the statistics to the firmware of the memory sub-system.

Figure 6:
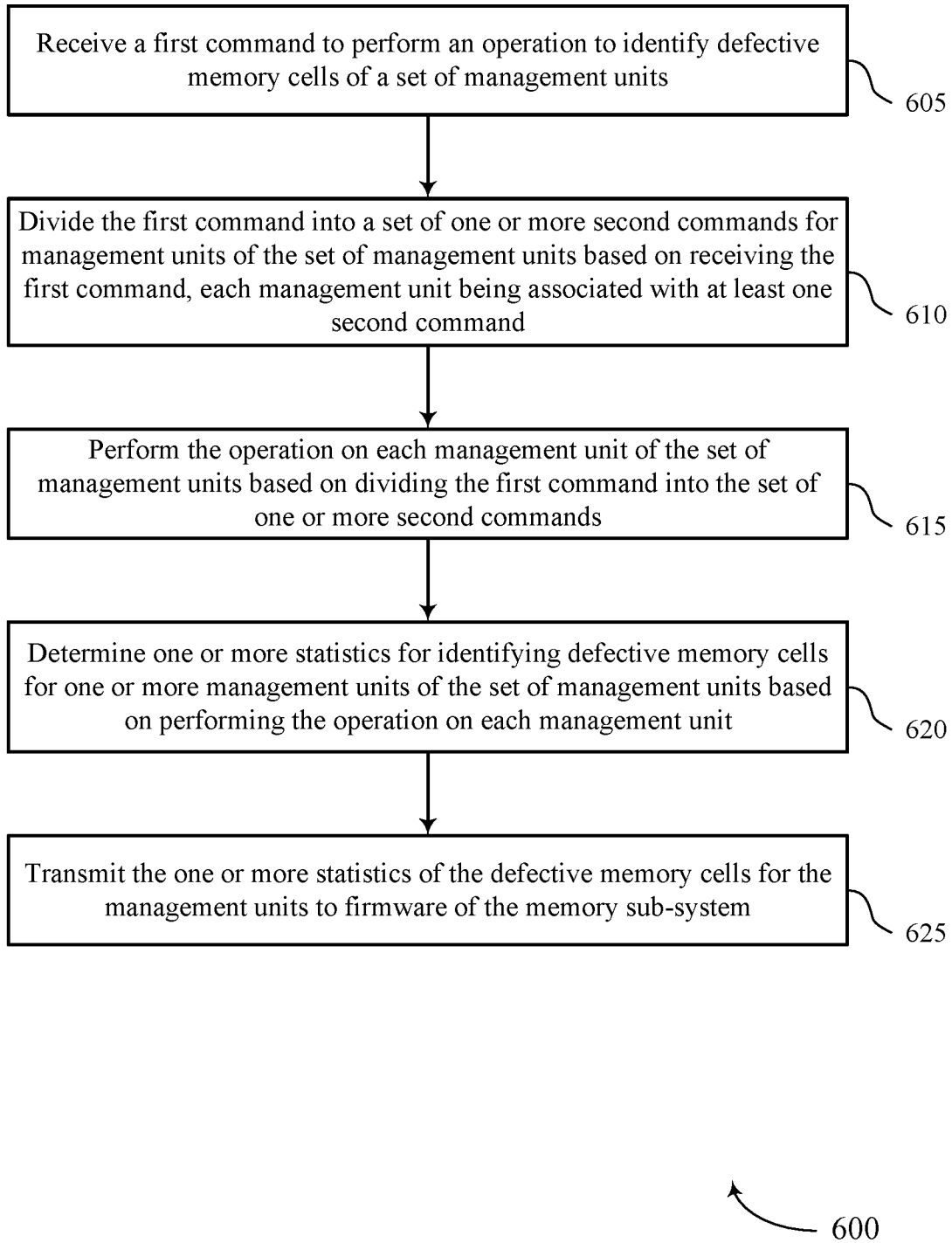

FIG. 6 shows a flowchart illustrating a method or methods 600 for performing operations on a set of management units, in accordance with aspects of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by a hardware based acceleration engine 150 of FIG. 1. The hardware can include processing logic, such as digital circuitry with dedicated (i.e., hard-coded) logic, to perform the operations described herein.

Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment. Other operation flows are possible.

At 605, the processing logic may receive a first command to perform an operation to identify defective memory cells of a set of management units. The command can be received from firmware of the memory sub-system or another component of the memory sub-system controller.

At 610, the processing logic may divide the first command into a set of one or more second commands for management units of the set of management units based on receiving the first command, each management unit being associated with at least one second command. In some examples, the first command for the set of management units includes a read command and the set of one or more second commands for each management unit includes a set of read commands.

At 615, the processing logic may perform the operation on each management unit of the set of management units based on dividing the first command into the set of one or more second commands. In some examples, performing the operation on each management unit includes executing one or more validation operations for one or more codewords of each management unit, and obtaining validation data for each management unit based on executing the one or more validation operations.

At 620, the processing logic may determine one or more statistics for identifying defective memory cells for one or more management units of the set of management units based on performing the operation on each management unit. In some examples, the processing logic may compile the validation data for each management unit into group validation data of the set of management units, a deck of the memory sub-system, a die of the memory sub-system, or a combination thereof, where determining the one or more statistics may be based on the group validation data.

At 625, the processing logic may transmit the one or more statistics of the defective memory cells for the management units to the firmware of the memory sub-system.

In some examples, the one or more statistics include a histogram, a greatest FBC, an average FBC of the management unit, a number of determined states, or a combination thereof. In some examples, the memory sub-system may be a 3D cross-point sub-system.

It should be noted that the methods described above describe possible implementations, and that the operations and the steps may be rearranged or otherwise modified and that other implementations are possible. Furthermore, portions from two or more of the methods may be combined.

Figure 7:
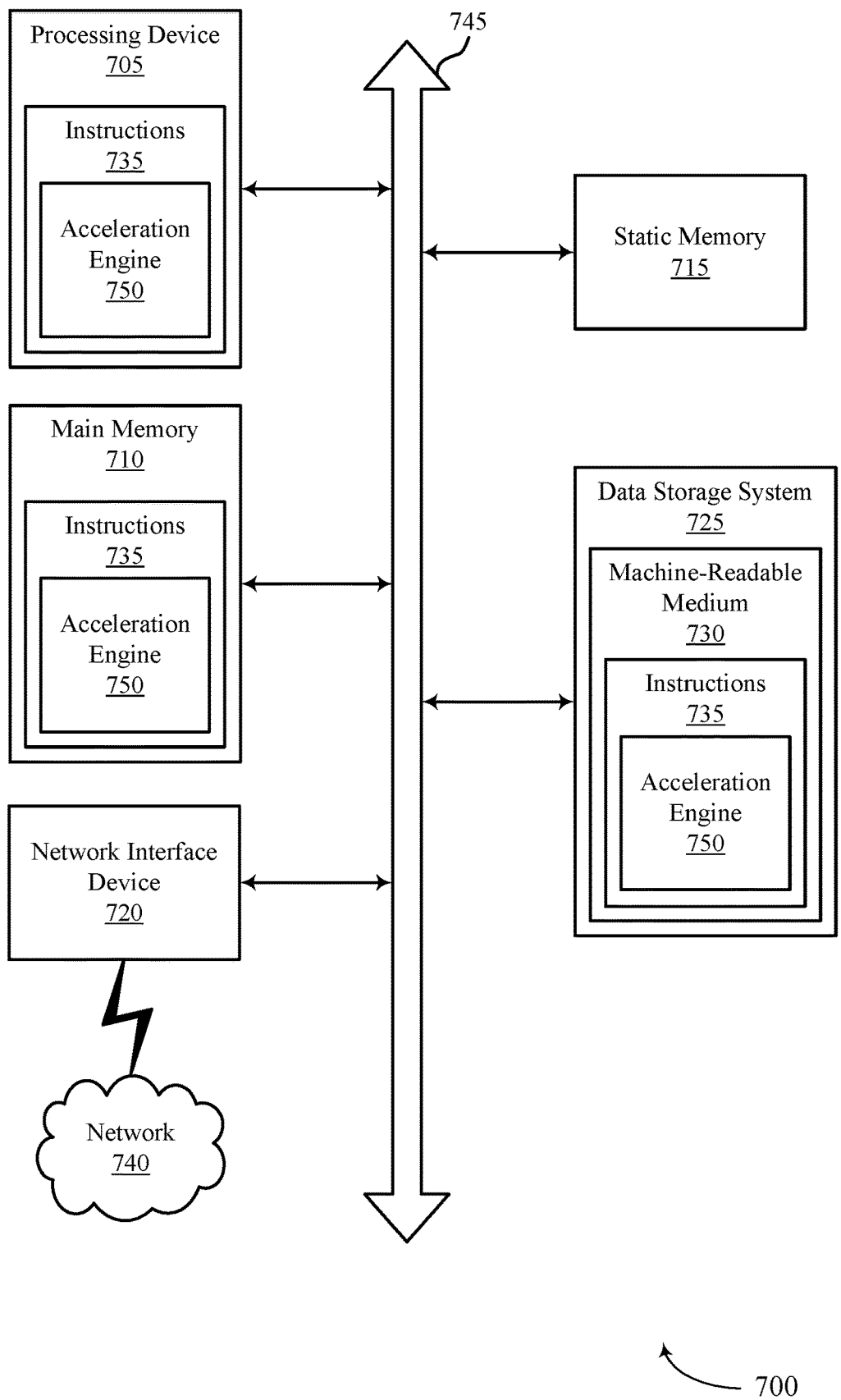
FIG. 7 illustrates an example machine of a computer system 700 that supports acceleration engines for memory sub-system operations in accordance with examples as disclosed herein.

FIG. 7 illustrates an example machine of a computer system 700 that supports acceleration engines for memory sub-system operations in accordance with examples as disclosed herein. The computer system 700 can include a set of instructions, for causing the machine to perform any one or more of the techniques described herein. In some examples, the computer system 700 can correspond to a host system (e.g., the host system 105 described with reference to FIG. 1) that includes, is coupled with, or utilizes a memory sub-system (e.g., the memory sub-system 110 described with reference to FIG. 1) or can be used to perform the operations of a controller (e.g., to execute an operating system to perform operations corresponding to the acceleration engine 150 described with reference to FIG. 1). In some examples, the machine can be connected (e.g., networked) with other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" can also include any collection of machines that individually or jointly execute a set (or multiple sets) of instructions to perform any one or more of the methodologies discussed herein.

The example computer system 700 can include a processing device 705, a main memory 710 (e.g., read-only memory (ROM), flash memory, DRAM such as synchronous DRAM (SDRAM) or RDRAM, etc.), a static memory 715 (e.g., flash memory, static random access memory (SRAM), etc.), and a data storage system 725, which communicate with each other via a bus 745.

Processing device 705 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 705 can also be one or more special-purpose processing devices such as an application specific integrated circuit (ASIC), a field programmable gate array (FPGA), a digital signal processor (DSP), network processor, or the like. The processing device 705 is configured to execute instructions 735 for performing the operations and steps discussed herein. The computer system 700 can further include a network interface device 720 to communicate over the network 740.

The data storage system 725 can include a machine-readable storage medium 730 (also known as a computer-readable medium) on which is stored one or more sets of instructions 735 or software embodying any one or more of the methodologies or functions described herein. The instructions 735 can also reside, completely or at least partially, within the main memory 710 and/or within the processing device 705 during execution thereof by the computer system 700, the main memory 710 and the processing device 705 also constituting machine-readable storage media. The machine-readable storage medium 730, data storage system 725, and/or main memory 710 can correspond to a memory sub-system.

In one example, the instructions 735 include instructions to implement functionality corresponding to an acceleration engine 750 (e.g., the acceleration engine 150 described with reference to FIG. 1). While the machine-readable storage medium 730 is shown as a single medium, the term "machine-readable storage medium" can include a single medium or multiple media that store the one or more sets of instructions. The term "machine-readable storage medium" can also include any medium that is capable of storing or encoding a set of instructions for execution by the machine and that cause the machine to perform any one or more of the methodologies of the present disclosure. The term "machine-readable storage medium" can include, but not be limited to, solid-state memories, optical media, and magnetic media.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

As used herein, the term "virtual ground" refers to a node of an electrical circuit that is held at a voltage of approximately zero volts (0V) but that is not directly coupled with ground. Accordingly, the voltage of a virtual ground may temporarily fluctuate and return to approximately 0V at steady state. A virtual ground may be implemented using various electronic circuit elements, such as a voltage divider consisting of operational amplifiers and resistors. Other implementations are also possible. "Virtual grounding" or "virtually grounded" means connected to approximately 0V.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some cases, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are signals), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
performing, by hardware of a memory sub-system, a set of one or more validation operations on one or more codewords of a management unit of the memory sub-system;
collecting, by the hardware of the memory sub-system, validation data for the management unit based at least in part on performing the set of one or more validation operations;
consolidating, by the hardware of the memory sub-system, the validation data of the management unit with validation data of at least one other management unit into group validation data associated with a set of management units based at least in part on collecting the validation data; and
transmitting, by the hardware of the memory sub-system, the group validation data to firmware of the memory sub-system.

2. The method of claim 1, further comprising:
generating statistics based at least in part on the validation data, wherein consolidating the validation data is based at least in part on generating the statistics.

3. The method of claim 2, wherein the statistics comprise a histogram, a greatest failure bit count (FBC), an average FBC of the management unit, a quantity of a subset of memory cells of a codeword corresponding to a state, or a combination thereof.

4. The method of claim 2, wherein the statistics correspond to a die of the memory sub-system, a deck of the memory sub-system, the management unit of the memory sub-system, the set of management units of the memory sub-system, or a combination thereof.

5. The method of claim 2, wherein transmitting the group validation data to the firmware of the memory sub-system further comprises:
transmitting the statistics to the firmware of the memory sub-system.

6. The method of claim 1, further comprising:
storing the validation data in a buffer of the memory sub-system based at least in part on collecting the validation data, the validation data comprising results of the set of one or more validation operations, wherein aggregating the validation data is based at least in part on storing the validation data in the buffer.

7. The method of claim 1, wherein the set of one or more validation operations comprises one or more failure bit count (FBC) operations, one or more read operations, or a combination thereof.

8. The method of claim 1, further comprising:
generating a command to collect the validation data of the management unit, wherein performing the set of one or more validation operations is based at least in part on generating the command.

9. The method of claim 1, wherein the management unit comprises pages associated with one or more dies and channels of the memory sub-system.

10. The method of claim 1, wherein the memory sub-system is a 3-dimensional cross-point sub-system.

11. The method of claim 1, wherein:
consolidating the validation data is performed by an acceleration engine of the memory sub-system.

12. The method of claim 1, wherein:
performing the set of one or more validation operations is performed by one or more error correction code (ECC) engines.

13. A method, comprising:
receiving, by hardware of a memory sub-system, a first command to perform an operation to identify defective memory cells of a set of management units;
dividing, by the hardware of the memory sub-system, the first command into a set of one or more second commands for management units of the set of management units based at least in part on receiving the first command, each management unit being associated with at least one second command;
performing, by the hardware of the memory sub-system, the operation on each management unit of the set of management units based at least in part on dividing the first command into the set of one or more second commands;
determining, by the hardware of the memory sub-system, one or more statistics for identifying the defective memory cells for one or more management units of the set of management units based at least in part on performing the operation on each management unit; and
transmitting, by the hardware of the memory sub-system, the one or more statistics of the defective memory cells for the management units to firmware of the memory sub-system.

14. The method of claim 13, wherein performing the operation on each management unit further comprises:
executing one or more validation operations for one or more codewords of each management unit; and
obtaining validation data for each management unit based at least in part on executing the one or more validation operations.

15. The method of claim 14, further comprising:
compiling the validation data for each management unit into group validation data of the set of management units, a deck of the memory sub-system, a die of the memory sub-system, or a combination thereof, wherein determining the one or more statistics is based at least in part on the group validation data.

16. The method of claim 13, wherein the first command for the set of management units comprises a read command and the set of one or more second commands for each management unit comprises a set of read commands.

17. The method of claim 13, wherein the one or more statistics comprise a histogram, a greatest failure bit count (FBC), an average FBC of the management unit, a number of determined states, or a combination thereof.

18. The method of claim 13, wherein the memory sub-system is a 3-dimensional cross-point sub-system.

19. A non-transitory computer-readable medium storing code, the code comprising instructions executable by a processor to:
perform, by hardware of a memory sub-system, a set of one or more validation operations on one or more codewords of a management unit of the memory sub-system;
collect, by the hardware of the memory sub-system, validation data for the management unit based at least in part on performing the set of one or more validation operations;
consolidate, by the hardware of the memory sub-system, the validation data of the management unit with validation data of at least one other management unit into group validation data associated with a set of management units based at least in part on collecting the validation data; and transmit, by the hardware of the memory sub-system, the group validation data to firmware of the memory sub-system.

20. The computer-readable medium of claim 19, wherein the code is further operable to cause the processor to:
generate statistics based at least in part on the validation data, wherein consolidating the validation data is based at least in part on generating the statistics.

21. The computer-readable medium of claim 20, wherein the statistics comprise a histogram, a greatest failure bit count (FBC), an average FBC of the management unit, a quantity of a subset of memory cells of a codeword corresponding to a state, or a combination thereof.

22. The computer-readable medium of claim 20, wherein the statistics correspond to a die of the memory sub-system, a deck of the memory sub-system, the management unit of the memory sub-system, the set of management units of the memory sub-system, or a combination thereof.

23. The computer-readable medium of claim 20, wherein the code is further operable to cause the processor to:
transmit the statistics to the firmware of the memory sub-system.

24. The computer-readable medium of claim 19, wherein the code is further operable to cause the processor to:
store the validation data in a buffer of the memory sub-system based at least in part on collecting the validation data, the validation data comprising results of the set of one or more validation operations, wherein aggregating the validation data is based at least in part on storing the validation data in the buffer.

25. A system, comprising:
a memory sub-system configured to:
perform, by hardware of the memory sub-system, a set of one or more validation operations on one or more codewords of a management unit of a memory sub-system;
collect, by the hardware of the memory sub-system, validation data for the management unit based at least in part on performing the set of one or more validation operations;
consolidate, by the hardware of the memory sub-system, the validation data of the management unit with validation data of at least one other management unit into group validation data associated with a set of management units based at least in part on collecting the validation data; and
transmit, by the hardware of the memory sub-system, the group validation data to firmware of the memory sub-system.

26. A system, comprising:
a memory sub-system configured to:
receive a first command to perform an operation to identify defective memory cells of a set of management units;
divide the first command into a set of one or more second commands for management units of the set of management units based at least in part on receiving the first command, each management unit being associated with at least one second command;
perform the operation on each management unit of the set of management units based at least in part on dividing the first command into the set of one or more second commands;
determine one or more statistics for identifying the defective memory cells for one or more management units of the set of management units based at least in part on performing the operation on each management unit; and
transmit the one or more statistics of the defective memory cells for the management units to firmware of the memory sub-system.

* * * * *